A. F. BRONNER & A. A. QUICK.
VARIABLE SPEED GEARING.
APPLICATION FILED AUG. 16, 1911.
1,144,808.
Patented June 29, 1915.
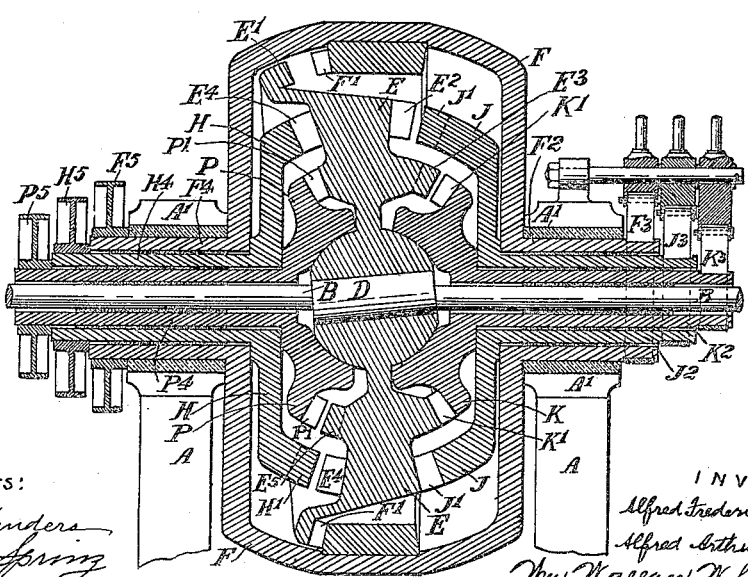
WITNESSES:
John C. Sanders
Leon Spring
INVENTORS
Alfred Frederick Bronner
Alfred Arthur Quick
BY Thos Wallace White
ATT'Y.

UNITED STATES PATENT OFFICE.

ALFRED FREDERICK BRONNER, OF MELBOURNE, AND ALFRED ARTHUR QUICK, OF NORTHCOTE, VICTORIA, AUSTRALIA.

VARIABLE-SPEED GEARING.

1,144,808.     Specification of Letters Patent.     Patented June 29, 1915.

Application filed August 16, 1911. Serial No. 644,335.

*To all whom it may concern:*

Be it known that we, ALFRED FREDERICK BRONNER, subject of the Emperor of Germany, and resident of 117 Collins street, Melbourne, and ALFRED ARTHUR QUICK, subject of the King of Great Britain and Ireland, and resident of Barry street, Northcote, Melbourne, in the State of Victoria, Commonwealth of Australia, have invented Improvements in Variable-Speed Gearing, of which the following is a specification.

This invention relates to certain improvements in epicyclic speed reducing or speed multiplying gearing, embodying the use of an oscillating wheel which engages with a fixed wheel and a rotating wheel, the motion being transmitted through the said rotating wheel.

The object of our invention is to provide means whereby the forces about the central point of oscillation are symmetrically balanced thus virtually supporting the central point of oscillation independently of the driving shaft, and operating cam thereon, and relieving the high speed or driving shaft of the back thrust from the teeth.

The effect of virtually supporting the central point of oscillation is to reduce the pressures on the journal bearings of the high speed or driving shaft.

This invention consists of certain improvements in gearing which comprises an oscillating wheel operated by a cam without shoulders or abutments so that the said oscillating wheel and the cam have mutual freedom of lateral movement, the said oscillating wheel engaging with a fixed wheel and a rotating wheel, the motion being transmitted through the said rotating wheel. Our improvement in gearings of this description comprises a spherical bearing concentric with the center of oscillation, surrounding the said cam whereby a reactionary force is brought to bear upon the center of oscillation to counteract and balance the resultant pressure about the central point of oscillation. The back thrust which arises from the pressures between the teeth is transmitted to the frame without passing through the high speed shaft, by being taken through the central spherical bearing, the peripheral speed of which is much less than that of the high speed shaft consequently the friction is slight.

In order that our invention may be better understood we will now proceed to describe the same with reference to the accompanying drawing in which is shown a side sectional elevation of a variable speed gearing, showing the adaptation of our invention thereto.

The drawing shows a variable speed gearing capable of producing a number of variations of speed. The driving shaft B is shown extending from one side to the other having a cam D working within an oscillating wheel E. The cam is set at the required angle for the necessary oscillations of the wheel E which is mounted thereon and is formed without flanges or side projections to permit of automatic lateral adjustment. The oscillating wheel E is formed with (in this case) five separate series of teeth, $E'$, $E^2$, $E^3$, $E^4$, $E^5$. The numbers of teeth on the wheels are so arranged as to produce the required ratios of speed when in operation. The series of teeth $E'$ mesh with the series of teeth $F'$ formed upon a wheel which in this case constitutes the casing F; the series $E^2$ mesh with the series $J'$ upon the wheel J; the series $E^3$ mesh with the series $K'$ upon the wheel K; the series $E^4$ mesh with the series $H'$ upon the wheel H; the series $E^5$ mesh with the series $P'$ upon the wheel P. The casing F, carrying the teeth $F'$ (arranged internally) is allowed to rotate and for this purpose is formed with extending sleeves $F^2$, $F^4$ one upon each side which work in bearings $A'$ upon the standards A. The sleeve $F^2$ upon one side is provided with a brake band $F^3$, and the sleeve $F^4$ upon the other side with a driving pulley $F^5$. The wheels J and K are formed with concentric bosses or sleeves $J^2$ and $K^2$ mounted with the sleeve $F^2$ and working one within the other around the driving shaft B. Brake bands $J^3$ and $K^3$ act respectively on the wheels J and K. The wheels H and P are likewise formed with concentric bosses or sleeves $H^4$ and $P^4$ mounted within the sleeve $F^4$ and working one within the other around the shaft B. Each boss or sleeve $H^4$, $P^4$ is provided with a driving pulley $H^5$ $P^5$.

The number of teeth respectively of the various series are as follows:

The series $E'$ comprises 39 teeth " " $F'$ " 40 " } Meshing together.
" " $E^2$ " 40 " " " $J'$ " 39 " } Meshing together.
" " $E^3$ " 20 " " " $K'$ " 19 " } Meshing together.
" " $E^4$ " 30 " " " $H'$ " 29 " } Meshing together.
" " $E^5$ " 24 " " " $P'$ " 23 " } Meshing together.

By this arrangement eight speeds may be obtained by the combination of the wheels which may be fixed upon one side with each of the wheels from which the power is taken upon the other side. Thus if the brake band $F^3$ locks the sleeve $F^2$ making the series of teeth $F'$ fixed then power may be taken from either of the pulleys $H^5$, $P^5$. If the brake band $J^3$ locks the boss or sleeve $J^2$ making the series of teeth $J'$ fixed, then power may be taken from either or all of the pulleys $F^5$, $H^5$, $P^5$. If the brake band $K^3$ locks the boss or sleeve $K^2$ making the series of teeth $K'$ fixed then power may be taken from either or all of the pulleys $F^5$, $H^5$, $P^5$.

The ratios from the driving shaft B to the various pulleys $F^5$, $H^5$, $P^5$ are approximately as follows:—

When $F'$ is fixed from pulley $H^5$ 16 to 1 reverse.
" $F'$ " " " " $P^5$ 14 to 1 reverse.
" $J'$ " " " " $F^5$ 20 to 1 forward.
" $J'$ " " " " $H^5$ 116 to 1 reverse.
" $J'$ " " " " $P^5$ 58 to 1 reverse.
" $K'$ " " " " $F^5$ 14 to 1 forward.
" $K'$ " " " " $H^5$ 58 to 1 forward.
" $K'$ " " " " $P^5$ 115 to 1 forward.

The oscillating wheel E is formed with a central spherical boss which bears in cups or recesses formed in the wheel K on one side and the wheel P on the other side for the purpose of balancing the resultant pressure at the central point of oscillation and thereby supporting the same.

In practice, the oscillating wheel and the cam are so made that the center of gravity of the two combined coincides with the central point of oscillation, so that the balance attained as above set out is not subjected to any disturbance due to the force of gravity.

We claim:—

In epicyclic gearing, in combination, a shaft, a cam thereon, an oscillating wheel provided with a central spherical boss within which said cam is positioned, a fixed wheel and a rotating driven wheel engaged by said oscillating wheel, and a spherical bearing for said spherical boss whereby said oscillating wheel is supported.

In testimony whereof we affix our signatures in presence of two witnesses.

ALFRED FREDERICK BRONNER.
ALFRED ARTHUR QUICK.

Witnesses:
CLEMENT A. HACK,
VERA CRUIKSHANK.